United States Patent [19]
Lehtinen

[11] 3,943,118
[45] Mar. 9, 1976

[54] METHOD OF ISOMERIZING FATTY ACIDS HAVING AN ISOLATED DIENE STRUCTURE AND DISPROPORTIONATING ROSIN ACIDS HAVING CONJUGATED DIENE STRUCTURE

[75] Inventor: Timo Pellervo Lehtinen, Oulu, Finland

[73] Assignee: Oulu Osakeyhtio, Oulu, Finland

[22] Filed: Oct. 26, 1973

[21] Appl. No.: 410,019

[30] Foreign Application Priority Data
Oct. 27, 1972   Finland .............................. 2984/72
June 8, 1973    Finland .............................. 1865/73

[52] U.S. Cl. .............................. 260/97.5; 260/405.6
[51] Int. Cl.$^2$ .......................... C09F 7/08; C09F 7/00
[58] Field of Search ................... 260/97.5, 98, 405.6

[56] References Cited
UNITED STATES PATENTS

| | | | |
|---|---|---|---|
| 1,957,788 | 5/1934 | Lister | 87/2 |
| 2,717,838 | 9/1955 | Barthel | 260/97.5 |
| 3,157,629 | 11/1964 | Patrick | 260/97.5 |
| 3,277,072 | 10/1966 | Patrick | 260/98 |
| 3,377,334 | 4/1968 | McBride | 260/97.5 |
| 3,528,959 | 9/1970 | Patrick | 260/97.5 |
| 3,860,569 | 1/1975 | Ward | 160/97.5 |

*Primary Examiner*—Lewis T. Jacobs
*Attorney, Agent, or Firm*—Schuyler, Birch, Swindler, McKie & Beckett

[57] ABSTRACT

A method for isomerizing fatty acids which contain an isolated diene structure (—CH=CH—CH$_2$—CH=CH—) and/or disproportionating rosin acids which contain a conjugated diene structure by bringing them in contact with sulfur and/or iodine at a raised temperature, wherein the acid mixture is treated with a sulfur rate of at the most 5% by weight and/or an iodine rate of at the most 0.4% by weight at a temperature of about 180°–250°C.

19 Claims, No Drawings

METHOD OF ISOMERIZING FATTY ACIDS HAVING AN ISOLATED DIENE STRUCTURE AND DISPROPORTIONATING ROSIN ACIDS HAVING CONJUGATED DIENE STRUCTURE

BACKGROUND OF THE INVENTION

1. Field of the Invention

The invention relates to an improved method of isomerizing fatty acids which contain an isolated diene structure (—CH=CH—$CH_2$—CH=CH—) and/or disproportionating conjugated diene rosin acids by bringing them in contact with sulfur and/or iodine at an elevated temperature.

2. Description of the Prior Art

An alkali soap of rosin acids and/or fatty acids is quite commonly used as a polymerization emulsifier when producing synthetic elastomers by free radical polymerization. The use of a fatty acid soap in addition to a rosin soap provides certain advantages, such as an acceleration of the polymerization.

Certain structural requirements are set for a fatty acid suitable for use as a polymerization emulsifier (1). Saturated fatty acids, as well as those containing one double bond, can be used. Thus, stearic and oleic acids are commonly used for this purpose. On the other hand, diene and polyene fatty acids, which contain the structural group —CH=CH—$CH_2$—CH=CH—, are not suitable to be used as emulsifiers owing to their retarding effect on the polymerization reaction. Fatty acids which contain the conjugated diene structure —CH=CH—CH=CH— do not have this disturbing influence, while the fatty acids which contain a conjugated triene structure are not suitable for use as polymerization emulsifiers.

Tall oil fatty acid obtained from crude tall oil by distillation and which usually has a fatty acid content of over 90 % cannot be used as such as a polymerization emulsifier of synthetic elastomers. For example, a typical Finnish tall oil fatty acid contains 50–60 % fatty acids which contain the structure —CH=CH—$CH_2$—CH=CH— and inhibit polymerization (linoleic and cis-5,9,12-octadecatrienoic acids). Some known methods for eliminating the acids of the said type from tall oil fatty acid are hydrogenation, dimerization, and isomerization. Technical hydrogenation and dimerization require a pressure reaction. The most common of the known isomerization methods (2) is most likely heating with an alkali, in which case the major part of the polyunsaturated fatty acids present in the tall oil fatty acid become conjugated. However, the technical realization of the method presents difficulties and the method has not become widely used.

The disproportionated rosin which is used as a polymerization emulsifier of synthetic rubber has traditionally been made mainly from gum rosin with the help of noble metal catalysts. Some other known disproportionation/dehydrogenation catalysts of rosin are nickel, sulfur, selenium, and iodine.

German Patent Specification No. 1,205,530 describes the disproportionation of gum rosin in two stages with the help of sulfur (1–10 %) and iodine (0.5 –2 %). The optimal rates are sulfur 2.8–3.5 % and iodine 0.8–1.0 %. The obtained product cannot be used as such but must be decolorized by a chemical treatment, e.g., with oxalic acid in mineral spirit. To obtain the final product, the solvent must be removed by distillation. Simultaneous use of sulfur and iodine yields a valueless pitch-like product.

U.S. Patent No. 3,277,072 describes the production of so-called fluid rosin with an iodine catalyst from tall oil rosin. Iodine is used at a rate of 0.01–3 % of the amount of rosin. The obtained product is characterized by a softening point (ball and ring method) below 55°C and a dehydroabietic acid content of less than 40 %. A complete elimination of the abietic acid from tall oil rosin by means of iodine is difficult without a considerable simultaneous decarboxylation of the rosin acids.

One of the objects of the present invention is to provide a method of producing from Finnish tall oil rosin a product which can be used as a polymerization emulsifier of synthetic rubber, in which the total amount of rosin acids with a conjugated diene system is 0–2 % and the dehydroabietic acid content calculated from the total rosin acids is over 50 %, and from which the polyunsaturated fatty acids containing the structural group —CH=CH—$CH_2$—CH=CH— can be eliminated; these fatty acids are originally present in the rosin and are typical of Scandinavian crude tall oil. An additional object is to create a simple production process (no use of a solvent and no redistillation of rosin). Furthermore, the rosin should be light enough as such, without chemical decolorization. The softening point of the rosin should be above 55°C to make transportation and handling in containers possible during summer. An additional requirement was that the product be odorless and have the lowest possible sulfur content.

SUMMARY OF THE INVENTION

According to the invention a disproportioned and isomerized tall oil product is prepared by heating a tall oil material at a temperature of from 180°–250°C. in the presence of sulphur and iodine catalysts, the amount of sulphur being 0.1–5% by weight and the amount of iodine being 0.01–0.4% by weight. The catalysts may be used either simultaneously or successively. The resulting product has an objectionable odor which may be removed by vacuum distillation, water or steam stripping, or treatment with alkali.

DESCRIPTION OF THE PREFERRED EMBODIMENT

Investigations led to the surprising finding that even very small rates of sulfur and iodine used simultaneously or in two successive reactions are sufficient for a complete disproportionation of tall oil rosin. An excellent result is obtained by using, for example, sulfur 1.75–1.5 % (2 hours at 220°C) and iodine 0.12–0.125-% (1 hour at 220°C). When the said catalyst amounts are used simultaneously, one 2-hour reaction period at 220°C is sufficient. The rosin acids which contain a conjugated diene system (abietic, neoabietic, and palustric acids) and the proportion of which of the total rosin acids in tall oil rosin is 50–60 % disappear from the rosin during the reaction so completely that in most trial batches their presence in the final product cannot be detected from a gaschromatogram (EGSS-X column).

Furthermore, a gaschromatographic examination of the product indicated that the polyunsaturated fatty acids present in the rosin (linoleic, cis-5,9,12-octadecatrienoic and cis-5,11,14-eicosatrienoic acids) and containing the structural group —CH=CH—$CH_2$—CH=CH— surprisingly disappear almost quantitatively during the said disproportionation reaction, while the monounsaturated oleic acid and saturated fatty acids (palmitic, stearic, arachidic, behenic, and lignoceric acids) undergo the effect of the catalyst pair at least apparently unchanged. The forcefulness of the catalytic reaction on the polyunsaturated fatty acids is reflected in the fact that when tall oil fatty acids were treated by the same method (sulphur 1.5 %, 2 hours at 220°C + iodine 0.15 %, 1 hour at 220°C) the polyunsaturated fatty acids had disappeared almost completely from the gaschromatogram of the methyl ester of the product. Let is be noted that the same reaction also takes place in the so-called combined fatty acids present in the neutral substance of rosin. The above reactions affecting rosin and fatty acid are obtained, complete and simultaneously, by a sulfur/iodine treatment according to the invention even in arbitrary mixtures of tall oil rosin acid and tall oil fatty acid.

The present invention has a significant additional advantage in the decolorization of the rosin during the process under the influence of iodine. The rate of iodine has a substantial effect on the color of the final product. For this reason it is advantageous to keep the iodine rate lower than 0.25 %. The bleaching effect of even an iodine rate of 0.3 % on the product is questionable, and with higher iodine rates the color of the product becomes much darker. A good example of this phenomenon is the German patent mentioned above, in which an iodine rate of 0.5–2 % was used for the disproportionation of gum rosin, in which case the product had to be decolorized chemically. When using the disproportionation method according to the present invention, for example, sulphur 1.5 % and iodine 0.15 %, the color of tall oil rosin improves from the normal value WG-N so that it is X-WW in the final product according to the U.S. Rosin standard color scale.

To balance the above, one property — the odor — of the disproportionated tall oil rosin produced according to this invention is so seriously disturbing that it makes the handling of the product (putting into containers in a molten state) and its use as such almost impossible. Although the catalyst rates used are very small, the odor of the product as such and in alkali soap solutions is unbearably repulsive.

In the performed investigations the production of the odor was discovered by surprise. When the method according to the invention was applied to gum rosin, the said repulsive odor was completely absent from the obtained product. This also explains why the German patent mentioned above contains no mention of odor problems. But the odor of the disproportionation product from tall oil fatty acid was very strong and repulsive. As it is known that gum rosin does not contain fatty acids, it was concluded that the odor of the disproportionated tall oil rosin produced by the method according to the present invention is caused by the joint effect of the catalyst pair used on the polyunsaturated fatty acids present in the rosin. To verify this, the effect of each catalyst separated was tested on both tall oil rosin and on tall oil fatty acid. The result was what was expected: the changes in the polyunsaturated fatty acids were less (gaschromatography); in the product treated with sulfur there was only a typical odor of hydrogen sulfide, while the product treated with iodine was practically odorless.

After many experiments, the method which proved suitable for deodorization was stripping, preferably after each reaction stage, by directing water on the rosin surface at a rate of about 3–5 % of the amount of rosin at 220°–160°C. The stripping provides two additional advantages: the rosin acid anhydrides present in the original tall oil rosin decompose and the acid value of the product respectively rises, and on the other hand part of the products of rosin acid decarboxylation become steam distilled, in which case the quality of the product improves. Alternatively, the odor problem can be eliminated by treating the completed product with an alkali rate of 2–4 % at about 220°C. The alkali can be added, for example, as a 50-percent water solution, and in this case, also, the above additional advantages are obtained and, in addition, the softening point of the product usually rises by 10°–20°C, depending on the type of alkali.

Approximately one-third of the sulfur used is removed from the system as hydrogen sulfide, while two-thirds of it becomes bound to the rosin. The hydrogen required for the production of the hydrogen sulfide is released from the dehydrogenating rosin acids. The sulfur content of the final product is not substantially changed by the water stripping. However, with a higher sulfur rate in the disproportionation it is more difficult to obtain a product with an acceptable odor by the said water stripping. When the rate of catalytic sulfur surpasses 2 %, the said problems already begin to appear. A manufacturer of synthetic rubber also prefers the minimum possible sulfur content in the disproportionated rosin. When using the optimal rate of sulfur catalyst according to this invention, i.e., 1.5 %, the sulfur content in the final product is 0.9–1.1%. This content has no disturbing effect on the polymerization or vulcanization of rubber.

The properties of disproportionated tall oil rosin according to this invention can be controlled within certain limits by means of the catalyst rates and especially by means of the ratio between the rates, for sulfur favors almost solely the dehydrogenation of rosin acids containing a conjugated diene system, while iodine favors rather the actual disproportionation. Furthermore, sulfur has a raising effect on the softening point of the final product, while iodine has a strongly lowering effect on it. The joint effect of the catalyst rates covered by the present invention is such that it generally somewhat lowers the softening point of rosin. Practicable catalyst pair systems are represented by, for example, the following rates of sulfur and iodine, when the reaction temperature is 220°C and the reaction periods 2 + 1 hours when using the catalysts successively and 2 hours when using them simultaneously.

| | | | |
|---|---|---|---|
| 3.0 | % S | 0.075 | % I$_2$ |
| 2.0 | % S | 0.10 | % I$_2$ |
| 1.75 | % S | 0.125 | % I$_2$ |
| 1.50 | % S | 0.15 | % I$_2$ |
| 1.25 | % S | 0.20 | % I$_2$ |
| 1.0 | % S | 0.25 | % I$_2$ |
| 0.5 | % S | 0.30 | % I$_2$ |

When using the extreme values of the table, the disproportionation tends to remain somewhat incomplete. When using the upper part of the table the disadvantage is a high sulfur content in the product and the advantage is a high dehydroabietic acid content and a high softening point. When using the lower part of the table, the disadvantage is a diminishing dehydroabietic acid content, a lowered softening point, and a rather dark color and the advantage is a low sulfur content.

The optimal catalyst rates are found approximately in the middle of the table.

The present invention offers, simultaneously or alternatively, a simple way of eliminating the fatty acids which contain the structural group —CH=CH—CH$_2$—CH=CH— from tall oil fatty acids or from any fatty acid mixtures. The linoleic and cis-5,9,12-octadecatrienoic acids contained in tall oil fatty acid disappear practically quantitatively when the tall oil fatty acid is treated with a catalytic amount of sulfur and iodine at a temperature of about 180°–250°C, either simultaneously or in two successive reactions. A very good result is obtained even with such small catalyst rates as sulfur 1.5 % and iodine 0.15 % when the reaction temperature is 220°C and the reaction period 2–3 hours.

During the reaction the rate of $C_{18}$-fatty acids containing the conjugated diene systems increases clearly in the tall oil fatty acid, but not enough to completely correspond to the elimination of the linoleic and cis-5,9,12-octadecatrienoic acids. The oleic acid with a monoene structure, as well as saturated fatty acids, remains unchanged in the reaction on the basis of a gaschromatographic analysis. However, some elaidinization of the oleic acid, i.e., its transformation into a trans-form, obviously occurs under the influence of the catalysts.

Very little decarboxylation of fatty acids takes place during the reactions, and consequently the acid value and the rate of unsaponifiables remain practically unchanged. On the other hand, the iodine value of tall oil fatty acid (Wijs) decreases during the reaction from the original value of 154 to about 90–110 in the final product. It must be noted that a conjugated diene fatty acid behaves in Wijs's iodine value determination in the same way as a monoene fatty acid.

Certain physical changes also take place in tall oil fatty acid owing to the reaction. Thus, its cloud point, i.e., the so-called titer, rises from its original value −10°C to about +10°C in the final product. Furthermore, the light refractive index of tall oil fatty acid ($n_D^{25}$) clearly grows under the influence of the reaction, i.e., from value 1.472 to value 1.479.

The product obtained according to the invention from tall oil fatty acid is not usable as such, for its color is very dark and its odor extremely repulsive. By distillation the product in a vacuum, a usable fatty acid mixture with an acceptable color and odor is obtained. The odor components and part of the color components end up in the fore run. The bulk of the color components remain in the distillation residue.

However, distillation always causes additional expenses and losses of material. If no specific requirements are set for the color of the product, it may be sufficient to only remove the fore run wth the bad odor. Also, a water or steam stripping at 100°–250°C may be used for removing the odor, under either normal or lowered pressure. Furthermore, a conventional bleaching earth treatment suitable for fatty acids can be used for the decolorization.

Redistillation is also eliminated when a tall oil fatty acid according to the invention is manufactured so that it is the crude tall oil that is subjected to the sulfur/iodine treatment, in which case the desired reaction of fatty acids and the complete disproportionation reaction of the rosin acids with a conjugated diene system are obtained simultaneously. When the obtained product of the reactions is then fed into a normal tall oil distillation proces, the odor components end up in the fore run, while the color components are divided between the fore run and the pitch. When so desired, the isomerized tall oil fatty acid and disproportionated tall oil rosin accordng to the invention can be separated from each other by distillation, but naturally they can be taken out of the distillation apparatus in the form of different mixtures as well. If both the fatty acid and the rosin are to be used as polymerization emulsifiers, it is not worth while to strive for a very distinct separation in the fraction distillation, and in this case it is not necessary to take a so-called intermediate distillates, for example.

When using the sulfur/iodine treatment for crude tall oil, higher catalyst rates must be used than in the isomerization of mere tall oil fatty acid or in the disproportionation of mere tall oil rosin. Firstly, this is due to the fact that in crude tall oil the abietic acid/dehydroabietic acid ratio is substantially higher than in tall oil rosin. Secondly, obviously those parts of crude tall oil which end up in the fore run and in the pitch contain a great deal of reactive components which consume catalysts. Actually sulfur and iodine cannot be considered mere catalysts in the actual sense of the word because they react at least partially in the process.

An acceptable result is obtained when crude tall oil is treated with, for example, a sulfur rate of 2–4 % and an iodine rate of 0.15–0.3 % either simultaneously or in two successive reactions at 180°–250°C, an appropriate reaction period being, for example, 2–3 hours at 220°C. When so desired, the reaction can be left somewhat incomplete, for completion of the reaction takes place even during the distillation. Overdimensioned catalyst rates accelerate the decarboxylation of acids during distillation.

The method can naturally be as well applied to fatty acid/rosin acid mixtues which have been obtained from crude tall oil by removing the fore run and/or the pitch. In this case lower catalyst rates will be sufficient. When very light-colored, odorless products are desired, the fore run and the distillation residue must be removed from the reaction product once more.

When the goal is to eliminate the fatty acids with the —CH=CH—CH$_2$—CH=CH— structure (linoleic and cis-5,9,12 octadecatrienoic acids) from tall oil fatty acid, a favorable result can be obtained also by treating the tall oil fatty acid with only sulfur or only iodine at about 180°–250°C and by using a sufficient catalyst rate and a sufficiently long reaction period. But the use of only sulfur or only iodine is not worth applying to crude tall oil for then the disproportionation of rosin acids is unsatisfactory.

When sulfur is added to tall oil fatty acid at a rate of 1 % at 180°C and is allowed to react for 2 hours at 220°C, only some decrease in the amount of acids with the structure —CH=CH—CH$_2$—CH=CH— can be observed in the gaschromatogram of the reaction product. Likewise, only a slight decrease appears in the iodine value. When the rate of sulfur is raised to 4 %, only some 10 % of the total linoleic and cis-5,9,12-octadecatrienoic acids remains in the reaction product. Even in this case, the saturated fatty acids and the oleic acid seem to remain at least apparently unchanged during the reaction. Some transformation of the oleic acid into the trans-form obviously takes place even under the influence of sulfur. Sulfur obviously has a two-way effect on polyunsaturated fatty acids. In addition to the sulfur becoming directly added to the double bonds, it also has a clear catalytic effect, which is manifested in the growth of the amount of fatty acids with a conjugated diene system. Hydrogen sulfide is released in the reaction. The decarboxylation of the fatty acids is insignificant during the reaction.

A tall oil fatty acid treated with sulfur has a dark color. Its odor resembles that of hydrogen sulfide and it is not as repulsive as the odor created in tall oil fatty acid by the joint effect of sulfur and iodine. By distillating the reaction product in a vacuum, a product with an acceptable color and odor is obtained. The sulfur content of the thereby obtained product with an acceptable composition is relatively high, 2–3 %.

When investigating the isomerization of tall oil fatty acid by means of only iodine it was noted that when, for example, iodine is added to tall oil fatty acid at a rate of 0.15 % at 140°C and the mixture is heated for 1 hour at 220°C, the bulk of the linoleic and cis-5,9,12-octadecatrienoic present in the tall oil fatty acid remains unchanged according to an analysis by gaschromatography. However, by adding the iodine catalyst to the tall oil fatty acid at room temperature, in which case the catalyst losses due to evaporation remain small, and by lengthening the reaction period to 2–3 hours at 220°C, a satisfactory isomerization result is already obtained with an iodine rate of 0.2–0.4 %, i.e., the fatty acids with the structure —CH=CH—CH$_2$—CH=CH— are practically completely eliminated.

During the reaction the linoleic and cis-5,9,12-octadecatrienoic acids become qiantitatively isomerized into respective acids with a conjugated diene system. The decarboxylation of fatty acids is minor. Simultaneously with the isomerization, some thermal dimerization of the produced conjugated diene acids takes place, obviously according to the Diels-Adler mechanism. This is manifested in that, at a certain reaction stage, the maximum amount of conjugated acids is present in the product according to a gaschromatographic analysis. When the reaction is continued from this stage, the proportion of the said acids in the reaction mixture begins to decrease. Dimerization due to heat only is, however, relatively slow at 220°C, and therefore, when so desired, the bulk of the reaction product can be distilled over in a vacuum. On the other hand, an almost complete dimerization reaction occurs when tall oil fatty acid is treated simultaneously with iodine 0.2 % and acid bleaching earth 4 %, for 2 hours at 220°C.

Tall oil fatty acid isomerized with iodine is in most cases usable as such, but when desired, the quality can be improved either by distillating the product over in a vacuum or by removing only a small amount of the colored fore run, which boils at a low temperature. Water or steam stripping at about 200°C can also be used for the removal of color components which boil at a low temperature. A bleaching earth treatment applicable to fatty acid mixtures can also be used for the decolorization.

By adding stearic acid to tall oil fatty acid as an internal standard, it could be verified on the basis of a gaschromatographic analysis that no substantial changes occur in the rate of oleic acid under the influence of the iodine reaction except for obvious elaidinization, i.e., transformation into a trans-form. In the gaschromatogram, the cis- and the trans-forms are not distinguishable from each other.

When considering the importance of this invention in terms of increasing the possible uses of tall oil fatty acid, we can state as follows:

By eliminating from tall oil fatty acids the fatty acids with the structure —CH=CH—CH$_2$—CH=CH— , a product is obtained which has a composition which makes it suitable for use as a polymerization emulsifier of SBR rubber, for example. If, for the same use, it is desirable to also eliminate from the reaction product the fatty acids having a conjugated diene structure and produced in the isomerization process, they can be easily caused to dimerize either during the isomerization or after it.

A tall oil fatty acid according to the invention can be used as an initial material in fatty acid dimerization processes which have been developed for fatty acid mixtures with high conjugated diene contents and the advantage of which is very mild reaction conditions.

Furthermore, an isomerized tall oil fatty acid according to the invention is most likely applicable in the alkyd industry because of its good drying properties.

When the invention is applied to crude tall oil, it offers an opportunity to use the entire tall oil distillation process for the simultaneous production of isomerized tall oil fatty acid and disproportionated tall oil rosin according to the invention.

A relatively inexpensive and easily obtainable raw material, tall oil rosin, can be transformed, by disproportionating it by a simple and inexpensive method according to the invention, into a high-standard product suitable for use as a polymerization emulsifier of synthetic rubber.

A disproportionated tall oil rosin manufactured according to the invention can also be used very well as a so-called tackifier in liquid adhesives, because it remains uncrystallized in most solvents from which an ordinary tall oil rosin becomes immediately crystalized.

One important application is the free rosin size needed in the paper industry. Sizes with a stability and emulsion particle size almost of the standard of those in a size manufactured from gum rosin can be produced by, for example, the Bewoid process from tall oil rosin disproportionated by the method according to this invention. It is known that tall oil rosin as such cannot be used for free rosin size owing to its great crystallization tendency.

EXAMPLES

EXAMPLE 1

10 000 kg of freshly distilled tall oil rosin at 200°C was pumped into an acid-resistant steel reactor with a gross volume of 14 m$^3$ and provided with a thermo-oil and cooling spiral and an anchor mixer. The rosin was cooled to 180°–190°C, and 150 kg of granulated sulfur was added to the rosin at an even rate in the course of an hour. After this addition the temperature of the rosin was raised to 220°C and kept at that for 2 hours. Some 50 kg of hydrogen sulfide was released during the reaction and conducted by means of a suction apparatus into a NaOH washer, where an equivalent amount of sodium sulfide was produced.

Thereafter, the first stage of the deodorization treatment was carried out by conducting water on the rosin surface at a rate of 100–150 l/h, until the temperature of the rosin was 160°C. In addition, indirect cooling by means of a cooling spiral was applied simultaneously to accelerate the cooling. The indirect cooling was continued until the temperature was 140°C. 15 kg of iodine (sublimated quality) was added to the rosin in one batch at 140°C. The temperature was raised as rapidly as possible to 220°–225°C and kept at that for 1 hour.

Thereafter the second and most important stage of the deodorization treatment was carried out by conducting 400 l of water on the rosin surface at the rate of 150 l/h. In order to shorten the total processing period, the rosin was simultaneously allowed to cool from 220°C to 160°C. The rosin was put in containers at 150°C, the yield being 9800 kg. Inert gas flowed into the gas chamber of the reactor during the entire process.

| Analyses | Initial rosin | Final product |
| --- | --- | --- |
| Acid value | 155 | 157 |
| Saponification value | 170 | 165 |
| Rosin acid content (Linder-Persson), % | 81 | 78 |
| Unsaponifiables, % | 5 | 8 |
| Abietic acid ⎫ , % (gas- | | |
| Neoabietic acid ⎬ chroma- | | |
| Palustric acid ⎭ tography) | 50 | 0.0 |
| Fatty acids with —CH=CH—CH$_2$—CH=λCH— structure, % | 4 | 0 |
| Rosin acid anhydrides, % | 2 | 0 |
| Hydroxy acids, % | — | 0.1 |
| Sulfur content, % | 0.02 | 1.0 |
| Color | WG-N | X-WW |
| Softening point (ball and ring), °C | 63 | 59 |
| Odor | | acceptable |

EXAMPLE 2

100 grams of Chinese gum rosin acid was placed in a three-necked flask provided with a mixer and a thermometer. The temperature of the rosin was controlled at 190°C, and 1.5 grams of sulfur was added to the rosin in the course of one-half hour. After the addition, the rosin temperature was brought to 220°C and kept at that for 2 hours. The rosin was cooled to 140°C, and 0.15 grams of iodine was added in one batch. The temperature was raised to 220°C and kept at that for 1 hour. No deodorization was carried out.

| Analyses: | Initial rosin | Final product |
| --- | --- | --- |
| Acid value | 165 | 156 |
| Rosin acid content, % | 90 | 84 |
| Abietic acid content, % (gaschromatography) | | 6 |
| Color | X-WW | M |
| Softening point, °C | 80 | 72 |
| Odor | | odorless |

The product contains too much rosin acids with a conjugated diene structure to be used as a polymerization emulsifier of synthetic rubber. Also notable is the considerable decrease in the acid value.

EXAMPLE 3

The disproportionation of a tall oil rosin/gum rosin mixture (8:2) was carried out exactly as indicated in Example 2.

| Analyses: | Final product |
| --- | --- |
| Acid value | 156 |
| Saponification value | 163 |
| Abietic acid content, % (gaschromatography) | 1.5 |
| Color | WG-N |

| Analyses: | Final product |
| --- | --- |
| Softening point, °C | 62 |

On the basis of the analysis, the obtained product can be used as a polymerization emulsifier of synthetic rubber.

EXAMPLE 4

The disproportionation of tall oil rosin was carried out exactly as indicated in Example 2. Finally the product was deodorized by adding NaOH at the rate of 3 % (as a 50 % water solution) to the rosin at 220°C.

| Analyses: | Final product |
| --- | --- |
| Softening point, °C | 69 |
| Color | K-1 |
| Odor | completely odorless |

Let it be noted that in regard to color, laboratory tests usually do not yield as good results as actual production.

EXAMPLE 5

100 grams of tall oil rosin was placed in a 3-necked flask provided with a mixer and a thermometer. The temperature of the rosin was controlled at 140°C. An amount of 0.15 grams of iodine was added to the rosin in one batch. The temperature of the rosin was raised to 180°C and 1.5 g of sulphur was added to the rosin at the course of one-half hour. The temperature was raised to 220°C and kept at that for 2 hours.

| Analyses: | Initial rosin | Final product |
| --- | --- | --- |
| Acid value | 156 | 156 |
| Rosin acid content, % (gaschromatography) | 80 | 77 |
| Abietic acid content, % (gaschromatography) | | traces |
| Color | M | WG-N |
| Softening point, °C | 64 | 59 |
| Odor (5 % H$_2$O at 220°C on rosin surface) | | acceptable |

The result is very surprising since according to German Pat. No. 1,205,530, for example, simultaneous use of sulfur and iodine for the disproportionation of gum rosin yielded a black, pitch-like, worthless product containing a great amount of unsaponifiables.

The advantage of this manufacturing method is a shorter processing period than that presented in Examples 1–4. This method is especially well applicable to a production in which the rosin must be melted from a container product.

EXAMPLE 6

100 grams of tall oil rosin was placed in a 3-necked flask provided with a mixer and a thermometer. The temperature of the rosin was raised to 120°C. A total of 1.5 grams of sulfur in three batches and 5 minutes later 0.15 grams of iodine in one batch were added to the rosin at the same temperature. The rosin temperature was raised to 220°C and kept at that for 2 hours.

| Analyses: | Initial rosin | Final product |
|---|---|---|
| Acid value | 156 | 154 |
| Rosin acid content, % | 80 | 76 |
| Abietic acid content, % (gaschromatography) | | traces |
| Color | M | I-H |
| Softening point, °C | 64 | 61 |

Even this production method yields a usable product, although its color remains darker than usual.

EXAMPLE 7

1.5 grams of sulfur was added to 100 grams of a mixture of tall oil rosin and tall oil fatty acid (87:13) at 190°C. The mixture was heated for 2 hours at 220°C. An amount of 0.15 grams of iodine was added to the reaction mixture at 140°C, and it was allowed to react for 1 hour at 220°C.

The acid value of obtained product was 163, its rosin acid content 70 %, color WG, and softening point 36°C. The very repulsive odor of the product disappeared during the water stripping (5 % water at 220°–200°C).

A gaschromatographic analysis indicated that the disproportionation of the rosin acids had taken place completely and the fatty acids with the structure group —CH=CH—CH$_2$—CH=CH— had been eliminated practically quantitatively.

When the experiment was repeated with mixtures in which the tall oil rosin/tall oil fatty acid ratio was 75:25 and 50:50, the above reactions concerning the rosin and fatty acids were also practically quantitative.

The method makes it possible to manufacture a rosin acid / fatty acid mixture suitable for use as a polymerization emulsifier of rubber.

EXAMPLE 8

0.125 grams of iodine was added to 100 grams of tall oil rosin fortified with 1 % fumaric acid according to Diels-Alder reactions at 140°C, and 1.75 grams of sulfur was added at 180°C, whereafter the reaction mixture was heated for 2 hours at 220°C.

The acid value of the obtained product was 164, its rosin acid content 81 %, color N, and softening point 66°C. A gaschromatographic analysis indicated that the rosin acids with a conjugated diene system had been eliminated completely. The repulsive odor of the product disappeared during the water stripping (3 % water at 220°C).

A similar result was obtained when the fumarization was carried out simultaneously with the disproportionation reaction or between the sulfur and the iodine reactions. This example only proved the fact, natural as such, that the disproportionality of tall oil rosin takes place by the method according to the invention even in tall oil rosin mixtures from which part of the rosin acids with a conjugated double bond system has been eliminated by some other reaction known as such (Diels-Alder reaction, paraformaldehyde treatment, etc.).

A tall oil fatty acid with the following analysis was used in the subsequent experiments:

| | |
|---|---|
| Acid value | 194 |
| Rosin acid content, % | 1.5 |
| Unsaponifiables, % | 2.8 |
| Iodine value (Wijs, 1 hour) | 154 |
| Color, Gardner | 5 |
| Light refractive index, $n_D^{25}$ | 1.4720 |
| Cloud point, °C | −10 |

Fatty acid composition, gaschromatographic analysis

| (EGSS-X column): | % |
|---|---|
| Saturated acids (palmitic and stearic acids) | 2 |
| Oleic acid | 35 |
| Cis-5,9-octadecadienoic acid | 2 |
| Linoleic acid | 41 |
| Cis-5,9,12-octadecatrienoic acid | 12 |
| Acids with conjugated diene structure | 8 |
| | 100 |

EXAMPLE 9

Trial results from the isomerization of tall oil fatty acid with sulfur and iodine either simultaneously (A) or in two successive reactions (B) are compiled in the following table. The reaction tempeature was 220°C in all experiments. The reaction period was 2 hours when the catalysts were used simultaneously and 2 hours for sulfur and 1 hour for iodine when they were used successively.

| Experiment No. | S % | I$_2$ % | Acid value | Iodine value (Wijs) | Linoleic/oleic acid | $n_D^{25}$ | Cloud point °C | Conjugated Diene % |
|---|---|---|---|---|---|---|---|---|
| TOFA | — | — | 194 | 154 | 1.1 | 1.4720 | −10 | 8 |
| 1 A | 0.50 | 0.05 | 194 | 135 | 0.65 | 1.4766 | + 8 | 20 |
| 2 A | 0.75 | 0.15 | 192 | 98 | 0.04 | | | |
| 3 A | 1.0 | 0.10 | 193 | 110 | 0.10 | 1.4797 | +12 | 32 |
| 4 A | 1.0 | 0.125 | 193 | 97 | 0.03 | | | |
| 5 B | 1.5 | 0.15 | 191 | 90 | 0.01 | | | 36 |

-continued

| Experiment No. | S % | I$_2$ % | Acid value | Iodine value (Wijs) | Linoleic/ oleic acid | $n_D^{25}$ | Cloud point °C | Conjugated Diene % |
|---|---|---|---|---|---|---|---|---|
| 6 B | 2.0 | 0.10 | 189 | 113 | 0.07 | | | |

*TOFA = tall oil fatty acid

The ratio between the peak weights of the methyl esters of linoleic and oleic acids obtained from the gaschromatogram of the reaction product has been used as an illustrative measure of the isomerization. This ratio is 1.1 in the original tall oil fatty acid and it corresponds to the ratio between the rates of the said acids precisely enough. The rate of oleic acid (35 %) or rather the total rate of oleic and elaidic acids (appear in the same peak in a gaschromatogram), remains practically unchanged in the reaction.

The linoleic and cis-5,9,12-octadecatrienoic acids are almost quantitatively eliminated by the isomerization. It can be noted as an interesting detail that the cis-5,9-octadecadienoic acid (3) present in the gaschromatogram between the oleic and the linoleic acids and which contains the structural group CH=CH—CH$_2$—CH$_2$—CH=CH seems expectedly to remain unchanged in the isomerization reaction. Respectively, the double bond at position 5 in the cis-5,9,12-octadecatrienoic acid will most likely remain unchanged in the reaction.

The following table illustrates the importance of the reaction temperature in isomerization. The catalysts (sulfur 1.5 % and iodine 0.15 %) were added to tall oil fatty acid at 25°C and the reaction period was 2 hours.

| Experiment No. | Reaction temperature °C | Linoleic/ oleic acid |
|---|---|---|
| 7 A | 150 | 0.73 |
| 8 A | 185 | 0.45 |
| 9 A | 220 | 0.02 |

Tall oil fatty acid isomerized with a sulfur/iodine catalyst was distilled over in a vacuum in order to improve its color and odor without, however, using a fractionating column. Thus, for example, when distillating trial batch 2 A under a pressure of 4 mm Hg yield was 4 % dark fore run with a bad odor and 74 % product with an acceptable odor and color (acid value 194, iodine value 97, and color 8 Gardner units).

EXAMPLE 10

3 grams of sulfur was added to 100 grams of crude tall oil (acid value 136, rosin acid content 39 %) at 180°C in the course of 1 hour. The mixture was heated for 2 hours at 220°C. The temperature was lowered to 130°C, and 0.20 grams of iodine was added to the mixture. The temperature was raised to 220°C and the mixture was heated for 1.5 hours at the said temperature.

A gaschromatographic analysis of the product indicated that the fatty acids with the —CH=CH—CH$_2$—CH=CH— structure (linoleic, cis-5,9,12-octadecatrienoic, and cis-5,11,14-eicosatrienoic acids) (4) had been almost completely eliminated, and the rosin acids with a conjugated diene structure (abietic, neoabietic and palustric acids) had become simultaneously almost completely disproportionated. During the reaction the acid value of the crude tall oil decreased to 130 and its rosin acid content to 36 %.

EXAMPLE 11

The following table contains results of the isomerization of tall oil fatty acid with only a sulfur catalyst. The sulfur was added to the tall oil fatty acid at 180°C and the actual reaction was allowed to take place at 220°C for 2 hours.

| Experiment No. | S % | Acid value | Iodine value Wijs | Linoleic/ oleic acid |
|---|---|---|---|---|
| 10 | 0.85 | 193 | 149 | 0.95 |
| 11 | 2.0 | | | 0.53 |
| 12 | 4.0 | 186 | 120 | 0.15 |

Trial batch 12 was distilled over under a pressure of 7 mm Hg in order to improve its color and odor, however, without using a fraction column:

| Distillation temperature, °C | Fraction 1 180–215 | Fraction 2 215–235 |
|---|---|---|
| Rate, % | 75 | 14 |
| Acid value | 190 | 174 |
| Iodine value (Wijs) | 115 | 120 |
| Linoleic/oleic ratio | 0.13 | 0.10 |
| Conjugated diene (UV), % | 16 | |
| Color, Gardner | 10 | 16 |
| Light refractive index $n_D^{25}$ | 1.4791 | |
| Cloud point, °C | +13 | |
| Sulfur content, % | 2.4 | |

Example 12

The following table contains results of the isomerization, with only an iodine catalyst, of tall oil fatty acid. The iodine was added to the tall oil fatty acid at 25°C and the reaction temperature was 220°C.

| Experiment No. | I$_2$ % | Reaction period, h | Acid value | Iodine value Wijs | Linoleic/ oleic acid | Color Gardner |
|---|---|---|---|---|---|---|
| 13 | 0.10 | 1 | | | 0.66 | |
| 14 | " | 2 | | | 0.48 | |
| 15 | " | 3 | 193 | 130 | 0.32 | |
| 16 | 0.20 | 1 | | | 0.14 | |
| 17 | " | 2 | | | 0.09 | |
| 18 | " | 3 | 193 | 106 | 0.07 | |
| 19 | 0.40 | 1 | | | 0.06 | |
| 20 | " | 2 | 191 | 101 | 0.03 | |

| Experiment No. | $I_2$ % | Reaction period, h | Acid value | Iodine value Wijs | Linoleic/ oleic acid | Color Gardner |
|---|---|---|---|---|---|---|
| 21 | 0.15[*) | 1 | 192 | 140 | 0.70 | |

[*)iodine was added in one batch at 140°C.

The following table illustrates the importance of the reaction temperature in the isomerization, with an iodine catalyst, of tall oil fatty acid. Iodine was used at the rate of 0.3 % of the amount of tall oil fatty acid and added at 25°C. The reaction period was 1 hour.

| Experiment No. | Reaction temperature °C | Linoleic/ oleic acid |
|---|---|---|
| 22 | 150 | 0.40 |
| 23 | 185 | 0.25 |
| 24 | 220 | 0.07 |

A gaschromatographic analysis indicated that the linoleic and cis-5,9,12-octadecatrienoic acids become quantitatively transformed into their respective isomers containing a conjugated diene structure. Furthermore, a mild thermal dimerization of the conjugated acids produced in the reaction could be detected from the gaschromatogram. The cis-5,9-octadecadienoic acid present in the gaschromatogram between the oleic and the linoleic acids seems to remain unchanged in the reaction. In the gaschromatogram of a completely isomerized tall oil fatty acid there is usually at the point of linoleic acid a small double peak of which it cannot be said with certainty whether it is really linoleic acid or some other component which is covered by linoleic acid in the initial tall oil fatty acid. By isomerizing a tall oil fatty acid to which stearic acid had been added as an internal standard it could be proven that the total rate of oleic and elaidic acids remains unchanged in iodine isomerization.

Trial batch 20 was distilled under a pressure of 5 mm Hg, however, without using a fractionating column. 4 % dark fore run was taken (80°–175°C). The yield of the actual distillate (175—212°C) was 81 % and its analysis was as follows:

| | |
|---|---|
| Acid value | 194 |
| Iodine value (Wijs) | 103 |
| Color, Gardner | 6 |
| Linoleic acid/ oleic acid ratio | 0.02 |
| Light refraction index, $n_D^{25}$ | 1.4740 |
| Cloud point, °C | +13 |

EXAMPLE 13

0.175 grams of iodine and 4 grams of bleaching earth (pH 5.7) were added to 100 grams of tall oil fatty acid. The temperature of the mixture was raised to 210°C, and it was allowed to react for 2 hours at the said temperature.

The viscosity of the tall oil fatty acid (30 cP) increased under the influence of the reaction to some 200 cP. A gaschromatographic analysis indicated that about 80 % of the linoleic and cis-5,9,12-octadecatrienoic acids had been eliminated and that the bulk of the produced conjugated acids had further become dimerized.

In a second experiment, 0.05 % paratoluene sulfonic acid was added as an acid catalyst to trial batch 18 produced by iodine isomerization, and the mixture was heated for 2 hours at 240°C. The viscosity of the final product was 230 cP. A gaschromatographic analysis indicated that most of the conjugated fatty acids had been dimerized.

What is claimed is:

1. A method of producing a disproportioned and isomerized tall oil product, comprising heating a tall oil material containing rosin acids and fatty acids in the presence of 0.1–5% by weight sulphur and 0.01–0.4% by weight iodine at a temperature in the range 180° to 250°C., and subjecting the product obtained to an odor removal treatment.

2. The improvement of claim 1 in which the sulphur and iodine are added to the mixture subsequently.

3. The improvement of claim 1 in which the sulphur and iodine are added to the mixture simultaneously.

4. The method of producing disproportionated and isomerized tall oil rosin according to claim 1 which tall oil rosin is heated to a temperature of from 210° to 230°C. in the presence of 1–3% by weight sulphur and 0.075–0.25% by weight iodine.

5. The method of claim 4 in which water or steam having a temperature of from 150° to 250°C. is fed into the product for odor removal.

6. The method of claim 4 in which 0.1–5% by weight alkali hydroxide or alkali carbonate is added to the product at a temperature of from 150° to 250°C. for odor removal.

7. The method of claim 1 wherein said tall oil material comprise a mixture of tall oil rosin and tall oil fatty acid.

8. The method of claim 1 wherein said tall oil material is distilled tall oil.

9. The method of claim 1 wherein said tall oil material is crude tall oil.

10. A method of producing a disproportionated and isomerized tall oil product comprising heating tall oil fatty acid at a temperature of from 210°–230°C. in the presence of 0.1–2% by weight sulphur and 0.05–0.2% by weight iodine and subjecting the product so obtained to vacuum distillation.

11. A method of producing a disproportionated and isomerized tall oil product comprising successively heating a tall oil material at a temperature in the range 180° to 250°C. in the presence of 0.1–5% by weight sulphur and 0.01–0.4% by weight iodine, and removing the odor from the disproportionated and isomerized product.

12. The method of claim 11 wherein the tall oil material is first subjected to a temperature of 180°–230°C. in the presence of sulphur, 1.5–2% by weight, and then to a temperature of 210°–230°C. in the presence of iodine, 0.1–0.15% by weight.

13. The process of claim 12 wherein said tall oil material is a mixture of tall oil rosins and tall oil fatty acids.

14. The process of claim 12 wherein said tall oil material is crude tall oil.

15. The process of claim 12 wherein said tall oil material is tall oil fatty acid.

16. The process of claim 12 wherein said tall oil material is tall oil rosin.

17. An improved method of simultaneously isomerizing and disproportionating mixtures of fatty acids containing an isolated diene structure and rosin acids containing a conjugated diene structure by adding to the mixture sulphur and iodine, and subjecting the mixture to an elevated temperature to isomerize the fatty acids and disproportionate the rosin acids, the improvement comprising:
adding to the mixture of most 0.4 per cent by weight iodine and at most 5 per cent by weight sulphur, and
reacting the mixture at a temperature of from 180° to 250°C.

18. The improvement of claim 17 in which the sulphur and iodine are added to the mixture subsequently.

19. The improvement of claim 17 in which the sulphur and iodine are added to the mixture simultaneously.

* * * * *